(12) United States Patent
Andersen

(10) Patent No.: US 8,141,361 B2
(45) Date of Patent: Mar. 27, 2012

(54) NATURAL GAS FUELED TURBOCHARGED INTERNAL COMBUSTION ENGINE

(75) Inventor: Jens Andersen, Cremlingen (DE)

(73) Assignee: Volkswagen AG, Wolfsburg (DE)

( * ) Notice: Subject to any disclaimer, the term of this patent is extended or adjusted under 35 U.S.C. 154(b) by 0 days.

(21) Appl. No.: 11/835,724

(22) Filed: Aug. 8, 2007

(65) Prior Publication Data

US 2008/0016864 A1  Jan. 24, 2008

Related U.S. Application Data

(63) Continuation of application No. PCT/EP2006/000682, filed on Jan. 26, 2006.

(30) Foreign Application Priority Data

Feb. 10, 2005  (DE) .......................... 10 2005 005 958

(51) Int. Cl.
*F02B 33/44* (2006.01)

(52) U.S. Cl. .............................. 60/611; 60/612; 123/562

(58) Field of Classification Search .................... 60/612, 60/611; 123/559.1–562, 559.3
See application file for complete search history.

(56) References Cited

U.S. PATENT DOCUMENTS

| | | | | |
|---|---|---|---|---|
| 4,489,699 A * | 12/1984 | Poehlman | | 123/525 |
| 4,884,530 A * | 12/1989 | Boekhaus et al. | | 123/575 |
| 4,903,488 A * | 2/1990 | Shibata | | 60/612 |
| 5,228,423 A * | 7/1993 | Oikawa et al. | | 123/525 |
| 5,315,973 A | 5/1994 | Hill et al. | | 123/304 |
| 5,329,908 A | 7/1994 | Tarr et al. | | 123/527 |
| 5,343,847 A * | 9/1994 | Chasteen et al. | | 123/527 |
| 5,479,906 A * | 1/1996 | Collie | | 123/525 |
| 5,542,392 A * | 8/1996 | Povinger | | 123/480 |
| 5,546,908 A * | 8/1996 | Stokes | | 123/525 |
| 5,584,467 A * | 12/1996 | Harnett et al. | | 123/527 |
| 5,590,528 A * | 1/1997 | Viteri | | 60/684 |
| 5,665,018 A * | 9/1997 | Miyata | | 474/74 |
| 5,694,899 A * | 12/1997 | Chvatal et al. | | 60/611 |
| 6,062,026 A * | 5/2000 | Woollenweber et al. | | 60/612 |
| 6,082,340 A * | 7/2000 | Heimark | | 123/559.1 |
| 6,244,044 B1 * | 6/2001 | Bartley | | 60/274 |
| 6,273,076 B1 * | 8/2001 | Beck et al. | | 60/612 |
| 6,694,242 B2 * | 2/2004 | Wong | | 123/526 |

(Continued)

FOREIGN PATENT DOCUMENTS

DE  3205721 A1 *  8/1983

(Continued)

OTHER PUBLICATIONS

International Search Report; EP/2006/000682; pp. 4, Jun. 27, 2006.

*Primary Examiner* — Mary A Davis
(74) *Attorney, Agent, or Firm* — King & Spalding L.L.P.

(57) ABSTRACT

In a gas fueled internal combustion engine, in particular a natural gas fueled internal combustion engine, as well as in a method for fuelling an internal combustion engine with gas, in particular with natural gas, with a charged "downsizing" Otto engine and an injection of the gas, a homogenous stoichiometric gas-air mixture is set and the charging takes place by an exhaust turbo charger as well as a compressor, which can be turned off and is located above the exhaust turbo charger in the air suction route.

15 Claims, 1 Drawing Sheet

| U.S. PATENT DOCUMENTS | | | | |
|---|---|---|---|---|
| 6,845,616 B2 * | 1/2005 | Jauss | | 123/559.3 |
| 6,845,746 B2 * | 1/2005 | Hilger et al. | | 123/298 |
| 6,907,867 B2 * | 6/2005 | Igarashi et al. | | 60/612 |
| 7,028,644 B2 * | 4/2006 | Cohn et al. | | 123/1 A |
| 7,059,296 B2 * | 6/2006 | Strom et al. | | 123/305 |
| 2003/0015185 A1 * | 1/2003 | Dutart | | 123/585 |
| 2003/0089346 A1 * | 5/2003 | Burkhart | | 123/526 |
| 2004/0083715 A1 * | 5/2004 | Le Leux et al. | | 60/280 |
| 2004/0144371 A1 | 7/2004 | Jauss | | 123/564 |
| 2006/0037318 A1 * | 2/2006 | Kloft et al. | | 60/605.2 |
| 2008/0228380 A1 | 9/2008 | Jauss et al. | | 701/111 |

| FOREIGN PATENT DOCUMENTS | | | |
|---|---|---|---|
| DE | 10062391 | A1 | 6/2002 |
| EP | 0430153 | A1 | 6/1991 |
| EP | 1363001 | | 11/2003 |
| JP | 61190123 | A * | 8/1986 |
| JP | 61205332 | A * | 9/1986 |
| JP | 02055829 | A * | 2/1990 |
| JP | 06323147 | A * | 11/1994 |
| JP | 08200161 | A * | 8/1996 |
| WO | WO 2004025097 | A1 * | 3/2004 |
| WO | 2004/097198 | A1 | 11/2004 |

* cited by examiner

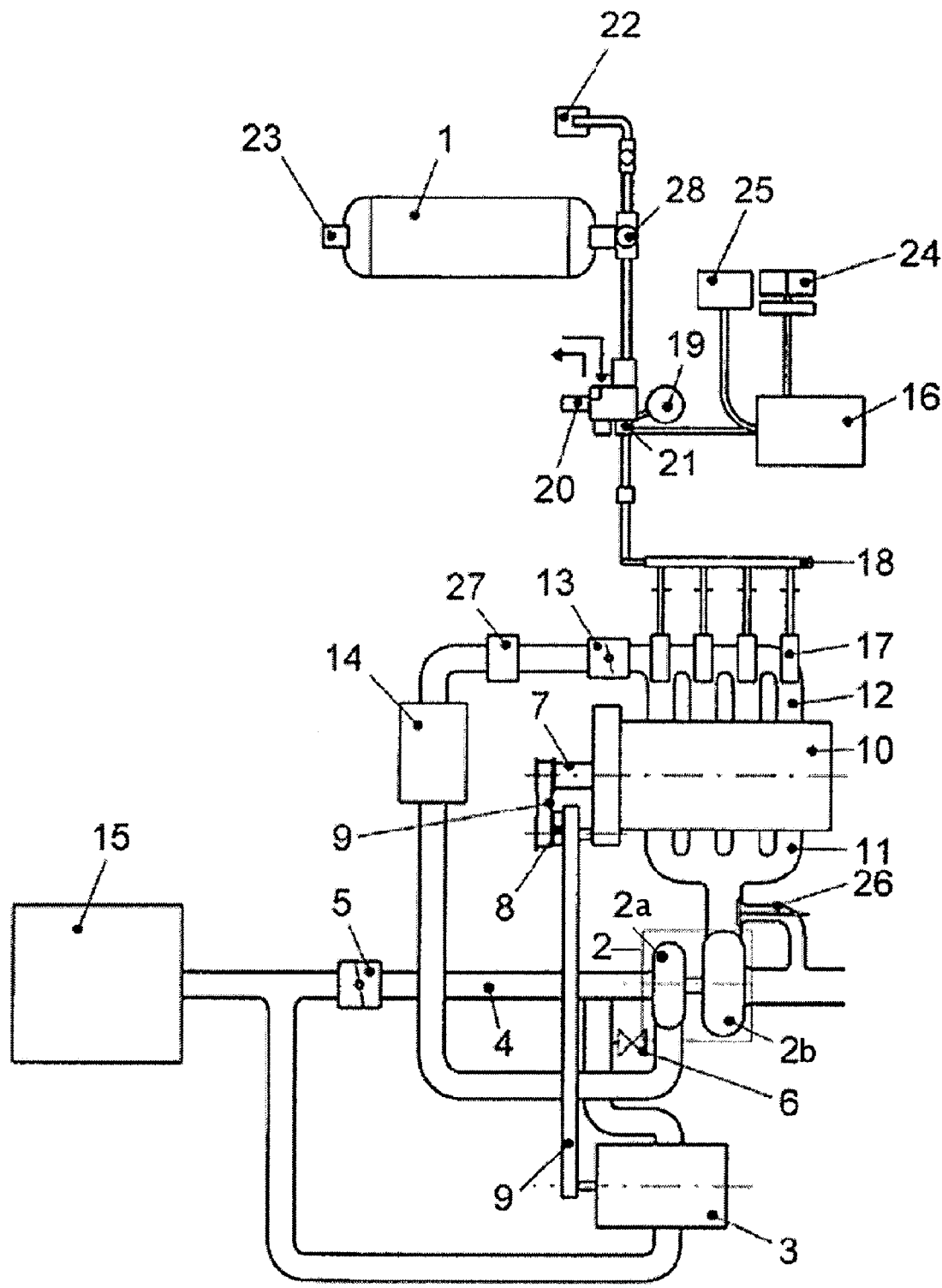

NATURAL GAS FUELED TURBOCHARGED INTERNAL COMBUSTION ENGINE

CROSS-REFERENCE TO RELATED APPLICATIONS

This application is a continuation of copending International Application No. PCT/EP2006/000682 filed Jan. 26, 2006, which designates the United States, and claims priority to German application number 10 2005 005 958.9 filed Feb. 10, 2005, the contents of which are hereby incorporated by reference in its entirety.

TECHNICAL FIELD

The invention concerns a method to run an internal combustion engine with gas, as well as a gas fueled internal combustion engine, in particular for a vehicle engine run by natural gas, wherein the internal combustion engine is run by charging it.

BACKGROUND

Natural gas has increased in significance in recent times on account of its properties as an alternative fuel. From the combustion engine point of view natural gas is interesting above all on account of its high octane content and the consequent high degree of anti-knocking properties and relatively high energy density. A further advantage is the low content of catalytic converter pollutants such as phosphorus and sulfur and the low proportion of carbon in comparison with gasoline or diesel. Natural gas, thus, has good combustion properties with a low degree of emissions of pollutants and lowered $CO_2$ emissions.

Natural gas in a highly compressed form with the designation CNG (Compressed Natural Gas) is used. The compressed gas is filled in the tank under pressure of approx. 200 bar and in the process reduced to one two-hundredths of its volume.

Natural gas fueled vehicles are being offered at present in two different forms, with a bivalent or monovalent internal combustion engine. Bivalent internal combustion engines can be run both with natural gas as well as with gasoline. These however do not use the power of natural gas and make natural gas propulsion more expensive as two complete fuelling systems are required.

Monovalent vehicles are run by natural gas alone or have an emergency tank with up to 15 liters of gasoline. The internal combustion engine is optimized for usage with natural gas propulsion.

Natural gas fueled internal combustion engines were conceived in the past above all with respect to the factor of pollutant emissions. In order to provide an optimal conversion of pollutants in the catalytic converter in dynamic operation as well, a precise stoichiometric combination of the natural gas-air-mixture ($\lambda=1$) is necessary. The gas added mixture is therefore successful in certain cases of application with electronically regulated gas injection, for example, by means of a lambda regulation by means of an oxygen sensor and "multi-point" injection in front of the input valve of each of the cylinders of the internal combustion engine.

A crucial distinguishing characteristic from gasoline fueled internal combustion engines is the injection of the fuel in the form of a gas in the intake manifold. In this case a significant proportion of the suction air is displaced by the natural gas. Through this process the charging and, with it, the performance of the internal combustion engine also reduces.

It is well known that the performance of a usual reciprocating piston engine, if run with natural gas, is approx. 15% under that of one run with gasoline and under that of charged diesel engines.

A partial offsetting of the minimal performance is, as disclosed in DE 100 62 391 A1, possible through charging the internal combustion engine with natural gas.

A further reduction of the existing performance and consumption disadvantages of natural gas propelled internal combustion engines as opposed to the charged diesel engines of today is possible through the use of lean-burn engine concepts. The lower degree of load on components in the case of lean-burn engines allows a significant increase in the supercharging pressures. However the combustion speed is lowered in the case of very lean mixtures so that an intensified charging motion is necessary as a compensatory measure. Corresponding lean-burn engines comprise along with combustion methods with increased lean-burn running capability an exhaust turbo charging with charge-air cooling. The density proportion is, depending on the concept, between 1:11 and 1:13.

Alongside the developments in the branch of lean-burn engines, there are solution concepts to increase the degree of effectiveness of internal combustion engines fueled by natural gas by the direct injection of the fuel in the combustion chamber. The fuel in the form of a gas is injected in this case at around the end of the compression process under high pressures of 200 bar directly into the combustion chamber located in the piston, of a highly compressed engine without a throttle. Through this a non-homogenous gas-air mixture is formed similar to the case of a diesel engine. Such an internal combustion engine is for example well known from the U.S. Pat. No. 5,329,908 A. When the gas pressure sinks below a pre-determined value however the commencement of the injection process and the length of the injection process has to be adjusted in order to ensure the inflow of the gas. In such a case a homogenous mixture is formed which requires a significantly reduced compression proportion. Since the internal combustion engine is propelled with a constant compression proportion, the compression proportion to be selected is dependent on the type of propulsion with the highest tendency to knocking, i.e. with a homogenous formation of the mixture. As a result of this the running of the internal combustion engine is unreliable and not without problems, in particular under unsteady running conditions, and the degree of effectiveness of the internal combustion engine is not optimal at full load.

SUMMARY

The $CO_2$ emissions as well as pollutant emissions of internal combustion engines can be significantly lower and at the same time a low total running—and manufacturing costs of the internal combustion engine as well as improved properties of the internal combustion engine can be maintained.

According to an embodiment, a natural gas fueled internal combustion engine may comprise a chargeable Otto engine with a reduced cubic capacity and increased maximal engine torque as compared to a non-chargeable Otto engine with the same output, a gas injection system for the injection of the natural gas in an air suction route located above the cylinders of the internal combustion engine, an exhaust turbo charger with a supercharger, and a turbine as well as a compressor located in the air suction route above the supercharger.

According to another embodiment, a method to fuel an internal combustion engine with natural gas wherein the internal combustion engine is designed as a chargeable Otto engine with a reduced cubic capacity and increased maximal engine torque as compared to a non-chargeable Otto engine with the same output, may comprising the steps of: charging the internal combustion engine with an exhaust turbo charger as well as with a compressor located in the air suction route above the exhaust turbo charger, injecting the natural gas in an air suction route of the internal combustion engine, wherein a homogenous gas-air mixture is set at $0.9<\lambda<1.1$, highly compressing the gas-air mixture in the cylinders of the internal combustion engine, and igniting the gas-air mixture.

BRIEF DESCRIPTION OF THE DRAWINGS

FIG. 1 shows an embodiment of a natural gas fueled internal combustion engine.

DETAILED DESCRIPTION

The gas fueled internal combustion engine in accordance with an embodiment, in particular the internal combustion engine propelled by natural gas, is designed as a "downsizing" Otto engine, i.e. as a chargeable Otto engine with a reduced cubic capacity and increased maximal engine torque as compared with a non-chargeable Otto engine, and contains a gas injection system for the purpose of the injection of the gas into an air suction route above the cylinder, an exhaust turbo charger with a supercharger and a turbine, as well as a compressor located above the supercharger in the air suction route.

In the case of the method in accordance with an embodiment for the fueling of an internal combustion engine with gas, in particular with natural gas, a "downsizing" Otto engine is provided with an exhaust turbo charger as well as a compressor located above the supercharger in the air suction route, the gas is injected into the air suction route of the internal combustion engine wherein a homogenous gas-air mixture is created with $0.9<\lambda<1.1$, the gas-air mixture is highly compressed in the cylinders of the internal combustion engine and ignited.

The combustion may take place preferably through the external ignition by means of spark plugs. The preparation of the gas-air mixture takes place with a homogenous and preferably a stoichiometric mixture formation, wherein the performance setting of the internal combustion engine is realized through a change in the cylinder filling capacity.

In order to provide an optimal conversion of pollutants in a catalytic converter in dynamic running as well, a precise stoichiometric combination of the natural gas-air-mixture is preferably set to $\lambda=1$.

The combination in accordance with an embodiment of "downsizing" with combined compressor- and emission turbo-charging as well as gas injection in the suction pipe leads in the case of the running of an Otto engine with gas, in particular with natural gas (CNG), to the torque- and performance values of comparable diesel engines, wherein the $CO_2$ emissions are lowered by approx. 25%. The manufacturing costs of a vehicle propelled by natural gas by using an internal combustion engine in accordance with an embodiment are not higher in this case than for comparable vehicles with diesel engines and particle filters.

In the case of "downsizing" with respect to cubic capacity, smaller internal combustion engines charged for this are used, which copy the performance data of larger, non-charged internal combustion engines, wherein these are operated by a load point displacement in better operating spaces of the internal combustion engine from the point of view of the degree of effectiveness. The advantage lies in the clear reduction of losses on account of wear-and-tear, weight and construction space. In summary, a vehicle with a "downsizing engine" is more economical and lower in emissions. The cubic capacity of the internal combustion engine is preferably reduced by 30% to 50%, in particular by 35% to 45% and amounts in particular to 1.0 liter to 1.8 liters for an internal combustion engine run with CHG with double charging.

The gas stored in a tank at 200 bar, in particular CNG, can be released according to an embodiment in a gas injection system at surrounding pressure and injected via a gas injector directly in front of the input valve of the cylinders, preferably via one valve per cylinder. The homogenous preparation of the mixture takes place through the injection of the gas in a suction pipe, wherein preferably an air-gas mixture with $\lambda=1$ is set through regulation via the $\lambda$ sensors.

The gas-air mixture can be compressed in the cylinders at a compression proportion, which is preferably higher than that of the basis Otto engine to optimize the degree of efficiency, of preferably 12 to 14. The compression proportion is defined in this case as the quotient of the maximum and the minimum cylinder volumes. The maximum cylinder volume is obtained when the cylinder piston is located at the lower slack point; the minimal cylinder volume is obtained, when the cylinder piston is at the upper slack point. The method of compression is one of four operational cycles of the internal combustion engine and is responsible for the fact that the temperature and the pressure of the gas-air mixture are increased. A high compression proportion in this case allows a late ignition point on account of the more rapid combustion. The combustion takes place preferably on the basis of an ignition map optimized for the CNG fueling.

In the combustion chamber of the cylinder the compressed mixture can be ignited preferably by means of a spark plug. The provision of the ignition energy takes place in this instance via an ignition rinse, controlled by a control unit of the internal combustion chamber.

According to an embodiment of the gas fueled internal combustion engine, a bypass conduit bridging the compressor with an adjustable supercharger butterfly valve can be provided for the purposes of the control of the charging pressure and/or for the bridging of the compressor. In order to prevent undesirable backflows via the bypass butterfly valve in situations in which the compressor provides less air than is sucked out by the exhaust turbo charger from the chamber after the supercharger butterfly valve, a non-return valve can in addition be provided in the bypass conduit, which automatically opens in the case of the pressure in the bypass conduit being lower than desired.

The charging of the internal combustion engine may take place with an emission turbo charger. With a compressor located above the exhaust turbo charger in the air suction route, the internal combustion engine can be doubly charged, preferably in the lower rotational-speed range and up to a rotation speed of 1700 rpm or, depending on the properties of the engine, from an engine rotation speed onwards, from which onwards a sufficient charging pressure is available from the exhaust turbo charger for a continual transfer to charging exclusively through the emission turbo charger. With this the charging pressure can be increased and a reduction of the "turbo gap" in the case of low rotation speeds of the internal combustion engine can be achieved.

The compressor preferably displays a propulsive drive, which is connected and/or can be connected via a coupling with a crankshaft of the internal combustion engine, so that the internal combustion engine can run the compressor manually. The compressor is for example driven via a belt by the crankshaft. By means of the coupling, for example a magnetic coupling, the propulsive drive is separable, if so desired, from the crankshaft, so that in a lower rotational-speed range (until approx. 1700 rpm) an additional charging through the compressor is realized and in the case of higher rotation speeds, when the exhaust turbo charger provides sufficient charging, the compressor can be turned off, so that no further losses can result through the compressor.

With this a gas fueled internal combustion engine with robust torque curve over a broad rotational-speed range with, at the same time, a reduced cubic capacity is made available.

The internal combustion engine in accordance with an embodiment can also be designed for quasi-monovalent running, in which case, in case of an "emergency" or for the purposes of increasing the range, an Otto fuel (gasoline) can be injected into the suction pipe via an additional injection system from an emergency tank (<15 l volume).

The invention will now be explained in greater detail on the basis of an embodiment.

The natural gas fueled internal combustion engine of a mid-class vehicle represented in FIG. 1 is conceived of as a "downsizing" Otto engine with an output of 100 kW to 125 kW and possesses a volume of 1.4 liters.

The internal combustion engine contains a gas injection system with which natural gas can be injected from a tank 1 via a gas rail 18 and gas injectors 17 into the suction pipe 12 of the air suction route of the internal combustion engine. The natural gas, which is stored at a pressure of approx. 200 bar in the tank 1, is released in the gas injection system by means of a manometer 19 and pressure gauge 20 to a pressure of 5 to 9 bar, wherein a pressure as low as possible is sought to be achieved for the maximization of the range. The injection of the natural gas via the gas injectors 17 can take place earlier than is the case of Otto fuels. Similarly earlier ignition takes place over the entire ignition map on account of the ignition properties and anti-knocking properties of natural gas (CNG). The filling of the tank 1 takes place via the filling connector 22 and the opened tank valve 28.

Located in the air suction route of the internal combustion engine are an air filter 15, a compressor 3, a bypass conduit 4 bridging the compressor 3 with a supercharger butterfly valve 5, a supercharger 2a of the exhaust turbo charger 2, an charge-air cooler 14, an EGR valve 27, a throttle butterfly valve 13 and a suction pipe 12, which opens into the respective cylinders in a cylinder crank handle housing 10. Located in the exhaust route of the internal combustion engine are an exhaust manifold 11, the turbines 2b of the exhaust turbo charger 2 and a waste gate 26.

The supercharger butterfly valve 5 regulates in this case the compressing of the compressor 3 and provides the supercharger of the exhaust turbo charger 2 with sufficient air if the output of the compressor 3 is insufficient in this respect or the compressor 3 is unseated at sufficiently high rotation speeds. The push mode air circulation valve 6 serves to protect the exhaust turbo charger 2 from over-winding in push mode usage. The compressor 3 is driven via belt 9 by a crankshaft 7 of the internal combustion engine. In this case the driving power of the compressor 3 is separable from the crankshaft 7 by means of a coupling 8, for example a magnetic coupling. In the lower rotational-speed range up to 1700 rpm a double charging by the compressor 3 takes place. At higher rotation speeds the compressor 3 is uncoupled and a simple charging done by the exhaust turbo charger 2 runs the internal combustion engine. With this a robust torque curve of the internal combustion engine is realized over a broad rotational-speed range.

Gasoline can be injected from an emergency tank into the suction pipe 12 via a switch controlling the type of fuel propulsion 24 and engine controlling equipment 16 via an additional injection system (not shown. Switching to gasoline driven propulsion can, for example, be necessary if the control display shows that the tank 1 is no longer sufficiently filled.

The internal combustion engine described in an exemplary fashion above displays, despite reduced cubic capacity as compared to a comparable diesel engine, comparable output- and torque values. Through natural gas propulsion the $CO_2$ emissions are reduced by approx. 25%. The manufacturing costs of a vehicle with an internal combustion engine in accordance with various embodiments are in this case not higher than for diesel vehicles with particle filters and comparable output values. The consumption is of approx. 7.3 kg/100 km, through which the running costs can be reduced on account of the lower fuel price.

REFERENCE NUMERAL LIST

1 Tank
2 Exhaust turbo charger
3 Compressor
4 Bypass conduit
5 Supercharger butterfly valve
6 Push mode air circulation valve
7 Crankshaft
8 Coupling
9 Belt
10 Cylinder crank handle housing
11 Exhaust manifold
12 Suction pipe
13 Throttle butterfly valve
14 Charge-air cooler
15 Air filter
16 Engine control equipment
17 Gas injector
18 Gas rail
19 Pressure manometer
20 Pressure gauge
21 Stop valve
22 Filling connector
23 Thermal fuse
24 Switch to select the type of fuel propulsion
25 Control display
26 Waste gate
27 EGR valve
28 Tank valve

What is claimed is:

1. A natural gas fueled internal combustion engine comprising:
    a gas injection system operable to inject natural gas; and
    an air suction route to a cylinder housing of said natural gas fueled internal combustion engine, wherein the natural gas fueled internal combustion engine has a cubic capacity between about 1.0 liter to 1.8 liters and a compression proportion of 12 to 14, wherein the air suction route is coupled to the gas injection system, the air suction route comprising:
        an exhaust turbo charger comprising;
            a supercharger; and
            a turbine;
        a compressor located upstream from the exhaust turbo charger in the air suction route,
        a coupling for coupling and decoupling of the compressor with a crankshaft of the internal combustion engine;

a push mode air circulation valve coupling an output of the exhaust turbo charger with an input of the exhaust turbo charger; and a supercharger butterfly valve coupled between the exhaust turbo charger and the compressor and configured to deliver airflow to the exhaust turbo charger through said compressor in a first operation mode, and to deliver airflow directly to said exhaust turbo charger via a compressor bypass in a second operation mode, wherein control of the airflow supplied directly to said exhaust turbo charger via said compressor bypass is based at least on one of the following:

if the compressor provides an insufficient air amount to the exhaust turbo charger; or if the compressor is unseated.

2. The natural gas fueled internal combustion engine according to claim 1 wherein the natural as fueled internal combustion engine has an output of between 100 kW and 125 kW.

3. The natural gas fueled internal combustion engine according to claim 1, wherein the gas injection system comprises:

a tank storing natural gas;
a gas rail;
a plurality of gas injectors; and
wherein the gas rail and gas injectors are configured to inject the stored natural gas into the air suction route with an adjustable pressure.

4. The natural gas fueled internal combustion engine according to claim 1, wherein the compressor bypass comprises a bypass conduit in the air suction route which can be closed by said supercharger butterfly valve, wherein the bypass conduit couples the compressor with the supercharger butterfly valve.

5. The natural gas fueled internal combustion engine according to claim 1, further comprising
an emergency tank for storing gasoline,
an additional injection system,
engine controlling equipment for controlling injection of gasoline from the emergency tank into the additional injection system.

6. The natural gas fueled internal combustion engine according to claim 5, further comprising a control display indicating a filling condition of a natural gas tank.

7. The natural gas fueled internal combustion engine according to claim 1, wherein the coupling is a magnetic coupling.

8. A method comprising the steps of:
injecting natural gas from a gas injection system to an air suction route to an cylinder housing of an internal combustion engine, wherein the natural gas fueled internal combustion engine has a cubic capacity between about 1.0 liter to 1.8 liters and a compression proportion of 12 to 14, and wherein the air suction route comprises:

an exhaust turbo charger comprising:
a supercharger; and
a turbine;
a compressor located upstream from the exhaust turbo charger in the air suction route;
a push mode air circulation valve coupling an output of the exhaust turbo charger with an input of the exhaust turbo charger;
a coupling for coupling and decoupling of the compressor with a crankshaft of the internal combustion engine; and a compressor bypass comprising a supercharger butterfly valve coupled between the exhaust turbo charger and an air inlet;
controlling the supercharger butterfly valve such that air is delivered in series through the compressor, through the exhaust turbo charger, and into the internal combustion engine to obtain a homogenous gas-air mixture between about 0.9 to about 1.1;
wherein
if the compressor is providing insufficient air amount to the exhaust turbo charger or
if the compressor is decoupled from the crankshaft of the internal combustion engine,
then adjusting the supercharger butterfly valve for providing air directly to the exhaust turbo charger bypassing the compressor; and
activating the push mode air circulation valve in case the turbo charger overwinds.

9. The method according to claim 8, wherein injecting the natural gas comprises injecting the natural gas at a pressure of about 200 bar.

10. The method according to claim 8, further comprising compressing the gas-air mixture based at least on a compression efficiency.

11. The method according to claim 8, further comprising igniting the compressed gas-air mixture.

12. The method according to claim 8, further comprising the steps of:
providing an emergency tank for storing gasoline,
providing an additional injection system, and
injecting gasoline from the emergency tank into the additional injection system if a natural gas tank is no longer sufficiently filled.

13. The method according to claim 12, further comprising the step of indicating a filling condition of a natural gas tank on a display.

14. The method according to claim 8, wherein the compressor is decoupled from the crankshaft via a magnetic coupling.

15. The method according to claim 8 wherein the natural gas fueled internal combustion engine has an output of between 100 kW and 125 kW.

\* \* \* \* \*